(12) United States Patent
Watanabe et al.

(10) Patent No.: US 8,159,169 B2
(45) Date of Patent: Apr. 17, 2012

(54) PARKING BRAKE CONTROL DEVICE

(75) Inventors: Takashi Watanabe, Nagoya (JP);
Kazuma Kondo, Aichi-gun (JP);
Masaki Ninoyu, Obu (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 470 days.

(21) Appl. No.: 12/361,209

(22) Filed: Jan. 28, 2009

(65) Prior Publication Data

US 2009/0200976 A1 Aug. 13, 2009

(30) Foreign Application Priority Data

Feb. 13, 2008 (JP) ................................. 2008-031713

(51) Int. Cl.
*H02P 7/00* (2006.01)

(52) U.S. Cl. ............ 318/432; 701/37; 701/70; 701/105; 477/36; 477/37; 318/362; 318/372

(58) Field of Classification Search .................. 318/432, 318/362, 372; 701/37, 70, 105; 303/20, 303/112, 123, 138, 191; 477/36, 37
See application file for complete search history.

(56) References Cited

U.S. PATENT DOCUMENTS

| | | | |
|---|---|---|---|
| 5,539,641 A * | 7/1996 | Littlejohn | 701/70 |
| 6,435,625 B1 * | 8/2002 | Schwarz et al. | 303/20 |
| 6,959,969 B2 * | 11/2005 | Simpson et al. | 303/20 |
| 7,208,894 B1 * | 4/2007 | Earle | 318/105 |
| 7,227,324 B2 * | 6/2007 | Erben et al. | 318/430 |
| 7,431,133 B2 * | 10/2008 | Maron et al. | 188/162 |
| 2005/0173206 A1 * | 8/2005 | Reuter et al. | 188/72.7 |
| 2006/0049691 A1 * | 3/2006 | Deprez et al. | 303/191 |
| 2006/0163939 A1 * | 7/2006 | Kuramochi et al. | 303/122.04 |

FOREIGN PATENT DOCUMENTS

JP 2007-515344 A 6/2007

* cited by examiner

*Primary Examiner* — Walter Benson
*Assistant Examiner* — Jorge Carrasquillo
(74) *Attorney, Agent, or Firm* — Buchanan Ingersoll & Rooney PC

(57) ABSTRACT

In a parking brake control device, the minimum value of a motor current is set as an idle current after a motor begins to be driven, specifically, in a period during which the idle current is being sampled. As a result, the idle current is set to a value which reflects the temperature of an electric parking brake and the dispersion of individual units of the motor. Accordingly, it is possible to provide a parking brake control device, which can set a target current value capable of coping with the dispersion of the individual units of the motor by calculating the target current value by adding a target effective current necessary to generate an actuation force to the idle current set as described above.

3 Claims, 13 Drawing Sheets

PARKING BRAKE CONTROL DEVICE

CROSS REFERENCE TO RELATED APPLICATION

This application is based on and incorporates herein by reference Japanese patent applications No. 2008-031713 filed on Feb. 13, 2008.

FIELD OF THE INVENTION

The present invention relates to a parking brake control device for executing a lock/release control of an electric parking brake (hereinafter referred to as EPB).

BACKGROUND OF THE INVENTION

Conventionally, a parking brake is used for restricting movement of a parked vehicle. For example, a manual parking brake is used in which an operation force applied to an operation lever is transmitted to a brake mechanism of the parking brake when the operation lever pulls a brake cable caused by the operation force. An electrically driven parking brake is also used in which a rotational force of a motor is transmitted to the brake mechanism of the parking brake by pulling a cable making use of the rotational force of a motor, and the like.

In an EPB which is the electrically driven parking brake, when the brake is locked, a motor is rotated to a lock side (forward rotation) and a motor rotational force is transmitted to a brake mechanism (actuator) as well as the motor is stopped in a state that a brake force is generated, whereas when the brake is released, the brake force is released by rotating the motor to a release side (reverse rotation).

In the lock/release control, a desired lock state is maintained in such a manner that when a motor current reaches a target current value (motor cut current) at the time the brake is locked, the motor is stopped to the lock side.

However, the relation between a motor current and an actuation force generated by a brake mechanism for converting a force resulting from rotation of the motor to a brake force is varied by a condition such as a temperature and the like. The actuation force corresponds to the brake force and includes a force for pulling a cable, a force for depressing a brake shoe or a brake pad by the pulled cable in addition to the brake force itself. To cope with the above problem, Japanese Unexamined Patent Application Publication (Translation of PCT Application) No. 2007-515344 proposes a method of separating an idle current, which flows when a motor rotates without load, and a current consumed to generate an actuation force and determining a target current value only by the current consumed to generate the actuation force. Specifically, a motor temperature and an idle speed which is a rotation speed when a motor rotates without load are detected by sensors and the target current value is corrected according to their values.

However, in a method shown in the Japanese Unexamined Patent Application Publication No. 2007-515344, the relation between a motor temperature and a motor idling speed and correction values is previously determined as a function or a characteristics curve, and the correction values corresponding to the motor temperature and the motor idling speed detected by a sensor are set based on the function or the characteristics curve determined previously. Accordingly, all the correction values are set using the function or the characteristics curve which are previously determined as a premise. However, since the function and the characteristics curve are dispersed according to the dispersion of individual units of the motor, a problem arises in that the method shown in Japanese Unexamined Patent Application Publication No. 2007-515344 cannot make a correction in response to the dispersion of the individual units of the motor. Further, there is also a problem in that the sensor for detecting the motor temperature and the motor idling speed must be additionally provided.

SUMMARY OF THE INVENTION

Accordingly, in view of the above problems, an object of the present invention is to provide a parking brake control device capable of setting a target current value which can also cope with the dispersion of the individual units of the motor. Further, another object of the present invention is to provide a parking brake control device capable of setting the target current value without additionally providing a sensor for detecting a motor temperature or a motor idling speed.

To achieve the above object, the inventors earnestly examined the relation among a motor current including an idle current, the temperature of a brake mechanism for converting a force resulting from the rotation of a motor, and an actuation force.

FIG. 15 is a graph showing the relation among the motor current including the idle current, the temperature of the brake mechanism and the actuation force. As shown in the figure, it has been confirmed that the relation of the actuation force to the motor current changes between he brake mechanism is at a low temperature and at a high temperature and that, although the value of the motor current, i.e., the value of the idle current is offset when the amount of the actuation force is 0, the actuation force thereafter changes in an almost similar manner in correspondence to the change of the motor current regardless of the temperature. It is supposed the actuation force changes in the similar manner although the idle current is dispersed as a result that the idle current is increased because a mechanical mechanism of a portion disposed to a brake mechanism to generate the actuation force has a large friction as temperature lower and that the idle current is decreased because a current is unlike to flow because an electric resistance value is more increased as temperature higher.

Accordingly, as shown in FIG. 16, when the idle current is set so as to cancel the change thereof caused by a temperature change, the relation of the actuation force to the motor current is determined based on the idle current, and a current target value is set based on the relation, the target current value can be set so that the dispersion of the idle current due to the temperature change is suppressed.

According to a first aspect of a parking brake control device according to the present invention, the motor current output is stopped while a lock control portion executes a lock control for driving a motor by outputting the motor current thereto, to move a friction member in a direction toward a member to be subjected to friction attached to a wheel by an actuation force generated by driving the motor, and generating the brake force to the wheel when a motor current reaches a predetermined target current value, the parking brake control device is characterized in that an idle current value setting portion sets the minimum value of the motor current in a state that the actuation force is not generated after an inrush current, which is generated just after the motor current is output, as an idle current, and a target current value calculation portion calculates the target current value from the sum of the set idle current and a target effective current for generating the actuation force.

As described above, the minimum value of the motor current in the state that the actuation force is not generated after the inrush current, which is generated just after the motor current is output, as the idle current. Accordingly, the idle current is set to a value which reflects the temperature of an electric parking brake and the dispersion of individual units of the motor. As a result, when a target current value is calculated by adding a target effective current necessary to generate the actuation force to the idle current measured as described above, there can be provided a parking brake control device capable of setting the target current value which also copes with the dispersion of the individual units of the motor.

A second aspect of the parking brake control device according to the present invention is characterized in that an idle current value setting portion sets a motor current which begins to increase when the motor current continuously increases after an inrush current, which is generated just after the motor current is output, in a state the actuation force is not generated as an idle current.

As described above, the motor current which begins to increase when the motor current continuously increases can be also set as the idle current. Even if the idle current is set as described above, the same advantage as the first aspect of the present invention can be obtained.

A third aspect of the parking brake control device according to the present invention is characterized in that an idle current value setting portion sets a motor current which begins to decrease when a motor revolution continuously decrease after an inrush current, which is generated just after the motor current is output, in a state the actuation force is not generated as an idle current based on a detection signal from a motor revolution sensor for detecting the motor revolution.

As described above, the motor current which begins to decrease when the motor revolution continuously decreases can be also set as the idle current. Even if the idle current is set as described above, the same advantage as the first aspect of the present invention can be obtained.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
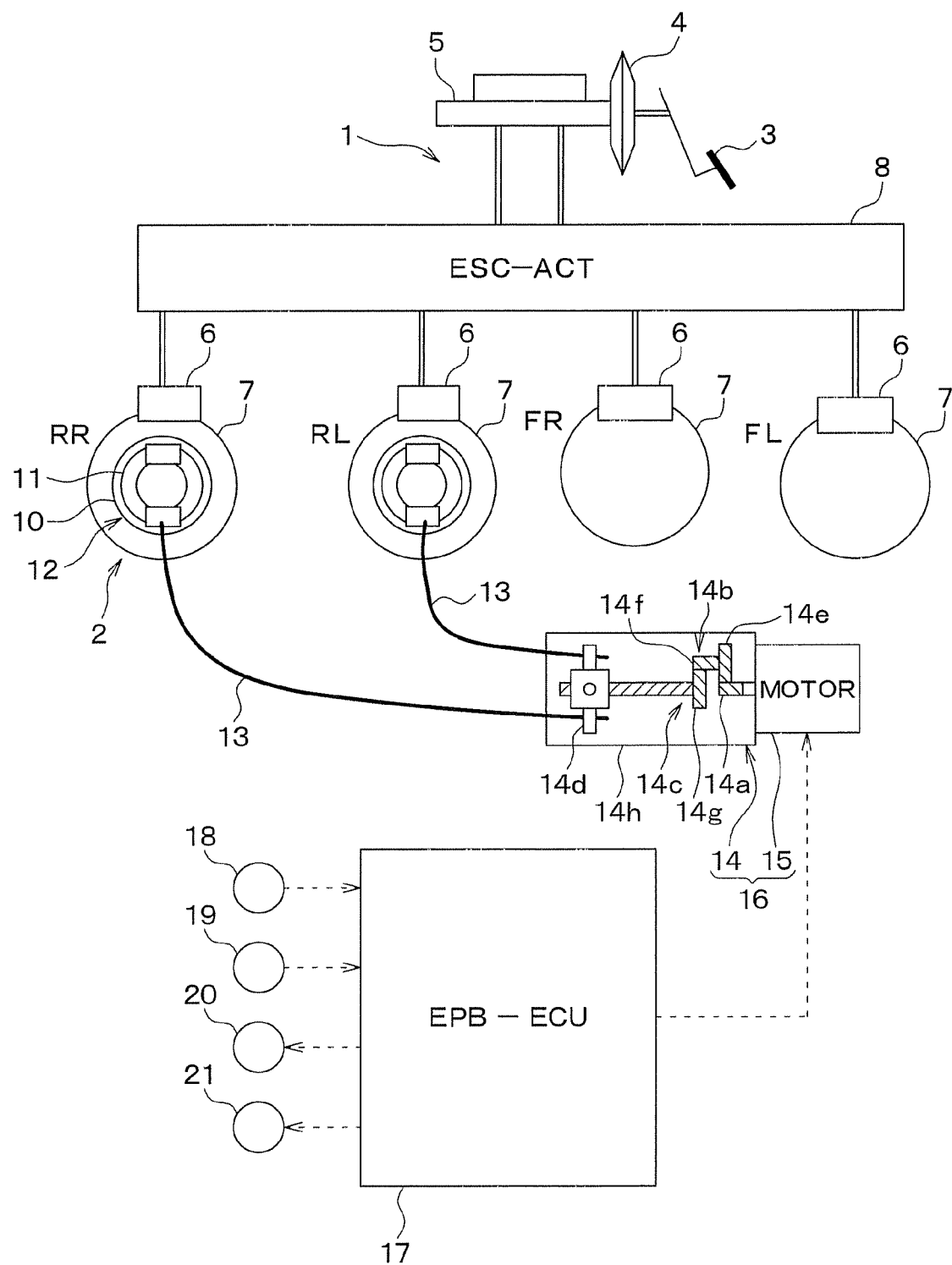
FIG. 1 is a schematic figure showing an overall structure of a vehicular brake system including a parking brake control device according to a first embodiment of the present invention.

Embodiments of the present invention will be explained below based on the drawings. Note that in the respective embodiments, the portions which are the same or equivalent with each other are denoted by the same reference numerals.

First Embodiment

A first embodiment pf the present invention will be explained. FIG. 1 is a schematic figure showing an overall structure of a vehicular brake system including a parking brake control device according to a first embodiment of the present invention.

As shown in FIG. 1, the brake system has a service brake 1 for generating a brake force based on a driver's depression force and an EPB 2 for restricting movement of a vehicle while parking.

A depression force generated when a driver depresses a brake pedal 3 is boosted by a brake booster 4. The service brake 1 generates a brake fluid pressure according to the boosted force in a master cylinder 5, and generates a brake force by transmitting the brake fluid pressure to wheel cylinders 6 of respective wheels. Specifically, brake discs 7 are clamped by brake pads disposed in calipers by transmitting the brake fluid pressure to the wheel cylinders 6, and the brake force is generated by the a friction force of the brake pads. Further, a brake fluid pressure control actuator 8 is interposed between the master cylinder 5 and the wheel cylinders 6 so that the brake force generated by the service brake 1 can be adjusted. Note that since the service brake 1 is conventionally well known, it is not explained in detail.

In contrast, the EPB 2 has parking brake mechanisms 12, each of which is composed of a parking brake drum 10, a brake shoe 11, and the like, an EPB actuator 16, which is composed of brake cables 13, a gear mechanism 14, and an electric motor 15, and an EPB control device (hereinafter referred to as an EPB-ECU) 17. The EPB 2 is composed of these components, and a brake force itself generated by the EPB 2 or a force for pulling the cables, and a force for depressing the brake shoes or the brake pads by the pulled cables (forces corresponding to the brake force) correspond to an actuation force which is referred to in the present invention.

Each of the parking brake mechanisms 12 generates the brake force in such a manner that a friction surface of the brake shoe 11 as a friction member comes into contact with an inner wall surface of the drum 10 as a member subjected to friction. Movement of a vehicle while parking is restricted by the brake force generated by the parking brake mechanisms 12. The brake shoe 11 in the parking brake mechanism 12 is driven by the brake cable 13 disposed to the EPB actuator 16. When the brake cable 13 is pulled, the friction surface of the brake shoe 11 is caused to come into contact with the inner wall surface of the drum 10 by the tension of the brake cable 13 and generates the brake force, whereas when the brake cable 13 is loosened from the pulled state, the brake force is released by that the friction surface of the brake shoe 11 is separated from the inner wall surface of the drum 10. The brake cable 13 is pulled and loosened by a force generated by converting the rotational force of the electric motor 15 to a linear motion force by the gear mechanism 14 disposed to the EPB actuator 16.

The gear mechanism 14 includes an input gear 14a disposed to a rotating shaft of the electric motor 15, a speed reduction gear 14b, an output shaft 14c, and a drive nut 14d. The speed reduction gear 14b is composed of a first spur gear 14e, which is meshed with the input gear 14a, and a second spur gear 14f which is coaxially disposed to a rotating shaft of the first spur gear 14e and the number of teeth of which is smaller than that of the first spur gear 14e. The output shaft 14c is a drive screw to which a male screw groove is formed, has a third spur gear 14g disposed to one end thereof and meshed with the second spur gear 14f of the speed reduction gear 14b. When the third spur gear 14g is driven by the electric motor 15 through the speed reduction gear 14b, the output shaft 14c is rotated coaxially with the third spur gear. The drive nut 14d is arranged such that it is moved in parallel with the output shaft 14c by a not shown guide disposed in a gear box 14h for accommodating the gear mechanism 14 and makes a linear motion. The brake cables 13 are connected to the drive nut 14d, and when the drive nut 14d is moved along the output shaft 14c by the rotation of the motor, the brake cables 13 are pulled and loosened.

In the gear mechanism 14 arranged as described above, when the electric motor 15 is stopped, the respective gears are also stopped at the same time, and the brake cables 13 can be maintained in a state as they are by the friction force resulting from the engagement of the output shaft 14c with the drive nut 14d. Accordingly, when the electric motor 15 is stopped at the time the brake force is generated by the parking brake mechanism 12 by pulling the brake cables 13 by rotating the electric motor 15, the brake force can be maintained.

The EPB-ECU 17 includes a known microcomputer having a CPU, a ROM, a RAM, an I/O, and the like and controls the parking brake by controlling the rotation of the electric motor 15 according to a program stored to the ROM and the like. The EPB-ECU 17 corresponds to the parking brake control device of the present invention. The EPB-ECU 17 inputs, for example, a signal according to an actuation state of an operation switch (SW) 18 disposed to an instrument panel (not shown) in a vehicle chamber and a signal detected by a forward/rearward acceleration sensor (forward/rearward G sensor) 19 and drives the electric motor 15 according to the actuation state of the operation SW 18 and forward/rearward acceleration of the vehicle. Further, the EPB-ECU 17 outputs a signal showing whether the EPB 2 is locked or released to a lock/release indication lamp 20 disposed to the instrument panel according to the drive state of the electric motor 15 and also outputs a signal indicating malfunction of the EPB 2 to a malfunction indicator lamp 34 when the EPB 2 is malfunctioning.

Specifically, EPB-ECU 17 has various function units for performing a lock/release control such as a motor current detection function for detecting a current (motor current) flowing to the electric motor 15 on an upstream or downstream side of the electric motor 15, a target current value calculation function for calculating a target current value (motor cut current) when a lock control is finished, a determination unit for determining whether or not a motor current reaches a target current value, a control unit for controlling the drive state of the EPB actuator 16 by controlling the electric motor 15 based on the actuation state of the operation SW 18. The EPB-ECU 7 executes lock/release control for locking and releasing the EPB 2 by rotating forward and rearward and stopping the electric motor 15 based on the state of the operation SW 18 and the motor current. The brake system according to the embodiment is arranged as described above.

Figure 2:
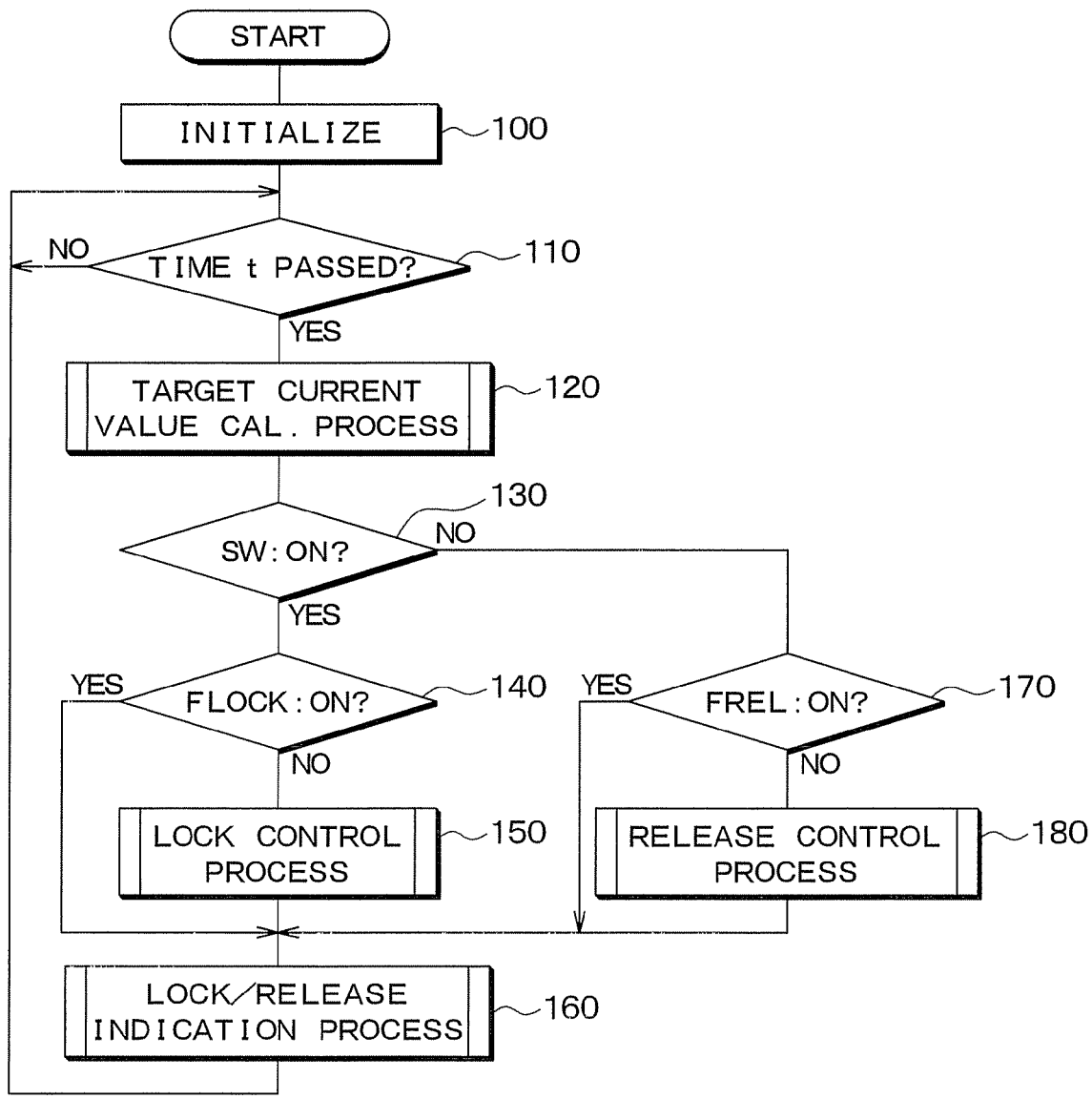
FIG. 2 is a flowchart showing details of a parking brake control.

Subsequently, a parking brake control, which is executed by the EPB-ECU 17 using the brake system arranged as described above according to the various function units and the program stored to the not shown built-in ROM, will now be described. FIG. 2 is a flowchart showing details of a parking brake control.

First, at step 100, an ordinary initialization process such as setting of a time measurement counter and resetting of flags is performed, and, thereafter, the process goes to step 110 and determines whether or not a time t passes. The time t is used to define a control cycle. That is, since the determination by the process is repeated until a time, which passes from the completion of the initialization process, or a time, which passes after an affirmative determination was made in a previous process, reaches the time t, the parking brake control is executed each time the time t passes.

At subsequent step 120, a target current value calculation process is performed. Although the target current value calculation process is explained below in detail, first, conception for calculating a target current value in the target current value calculation process will be explained.

As described above, since an idle current is dispersed due to a temperature change, it is set to a value according to the temperature of the EPB 2 (brake mechanism) when the lock control is performed, for example, according to the temperature of the gear mechanism 14 disposed to the EPB actuator 16. Then, although the idle current according to the temperature of the EPB 2 must be measured, since the motor current varies while the lock control is performed, it is not apparent that the idle current, which is measured at which timing, is to be used as the idle current according to the temperature of the EPB 2.

Accordingly, in the embodiment, the minimum value of the motor currents before an actuation force is generated is used as the idle current. Although the minimum value of the motor currents changes according to the temperature of the EPB 2, since a time necessary to perform the lock control once is short, the temperature does not greatly change during the control. As a result, the minimum value of the motor currents can be assumed as the idle current according to the temperature of the EPB 2 at that time. Further, when the minimum value of the motor currents is set as the idle current as described above, since the idle current is set to a value which includes a dispersion resulting from the dispersion of the individual units of the electric motor 15. Thus, when the target current value is set based on the idle current set described above, it is possible to set a target current value which also corresponds to the dispersion of the individual units.

However, at the moment when the motor current begins to flow, that is, when the electric motor 15 starts to rotate, since the motor current is greatly increased by an inrush current, it is preferable to eliminate the influence of the inrush current by selecting the minimum value of the motor currents after the inrush current.

Figure 3:
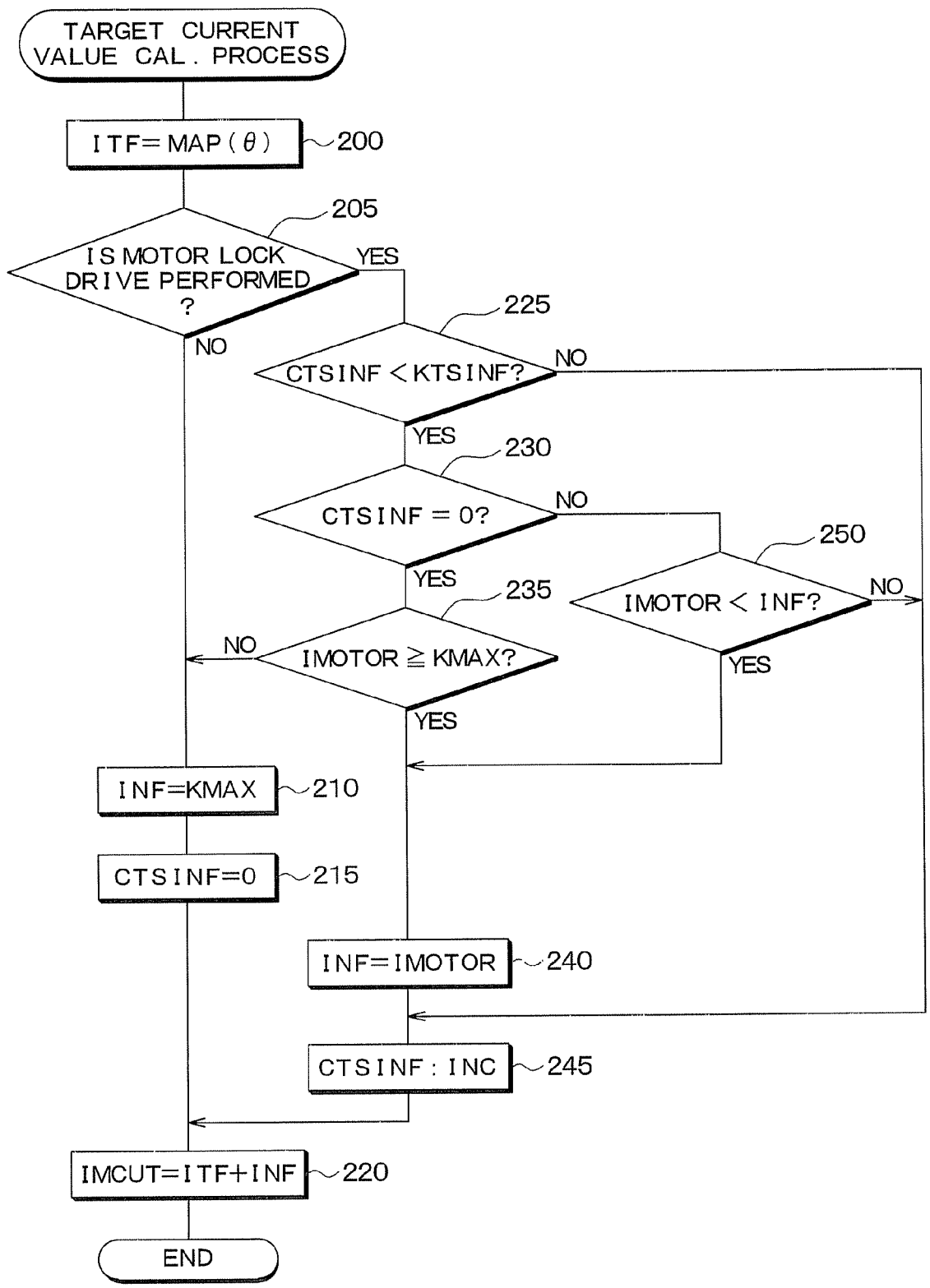
FIG. 3 is a flowchart showing a target current value calculation process.

Thus, in the embodiment, the target current value calculation process is performed as described below. FIG. 3 is a flowchart showing the target current value calculation process in detail.

Figure 4:
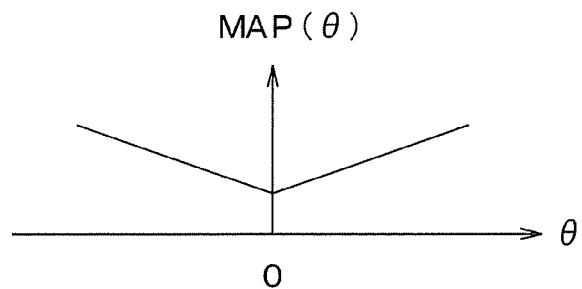
FIG. 4 is a graph showing a characteristics MAP (( ) of a road target effective current ITF to a road surface inclination.

First, When the target current value calculation process is performed, the process goes to step 200 and sets a target effective current ITF based on a road surface inclination θ determined by a known method based on a signal detected by the front/rear G sensor 19. Here, the target effective current ITF means a value to be added to the idle current INF to generate a target actuation force in the lock control, and a target current value IMCUT is obtained by the sum of the target effective current ITF and the idle current INF (target effective current ITF+idle current INF). Although the target effective current ITF may be set to a predetermined value, when a parking road surface inclines, the value is preferably increased according to the inclination of the road surface. Accordingly, in the embodiment, the characteristics MAP (θ) of the target effective current ITF to the road surface inclination θ shown in FIG. 4 is more increased as the road surface inclination θ increases, and the characteristics MAP (θ) is set as the target effective current ITF.

An advantage of generating a brake force according to the road surface inclination θ can be obtained by setting the target effective current ITF based the road surface inclination θ as described above. Further, when the target effective current ITF is not set based on the road surface inclination θ, the target effective current ITF is set in consideration of a certain degree of the road surface inclination θ to it from the beginning. In this case, however, since the brake cable 13 is pulled in consideration of the certain degree of the road surface inclination θ regardless, for example, a flat road, it is possible to overcome a problem in that the cables are excessively pulled, the durability of a mechanical system is deteriorated thereby, the delay due to an excessively generated brake force of response when a parking brake is released, and the like.

At subsequent step 205, whether or not a motor lock drive is being performed, that is, whether or not the lock control is being performed and the electric motor 15 is being rotated forward is determined. This determination is made based on whether or not a flag showing that the motor lock drive is performed is turned ON. When the lock control is not started, a negative determination is made and the process goes to step 210.

At step 210, an idle current maximum value KMAX, which is set as a predetermined value, is tentatively set as the idle current INF. Note that the idle current maximum value KMAX is a value which is assumed as the largest value of the idle current INF and previously determined by an experiment performed using a proto type. For example, the idle current INF, which is determined assuming a case that the dispersion of the individual units of the electric motor 15 and the temperature of the EPB 2 is minimized when an environment of use is also taken into consideration, or an idle current INF, which is set to such a degree that a motor current IMOTOR does not exceed the target current value IMCUT even if the motor current IMOTOR is momentarily increased as the inrush current, are set as an idle current maximum value KMAX.

Thereafter, the process goes to step 215. Since the idle current INF is not sampled in the process of this time, an idle current sampling timer CTSINF, which shows that the idle current INF is sampled, is set to 0, and the process goes to step 220. At step 220, the target current value IMCUT is calculated from the sum of the target effective current ITF and the idle current INF, and the process is finished.

In contrast, when an affirmative determination is made at step 205, the process goes to step 225 and determines whether or not the idle current sampling timer CTSINF shows a time less than the idle current sampling time KTSINF. The idle current sampling time KTSINF is set to a value which is assumed as a time when the idle current INF is sampled so that the idle current INF is set erroneously thereafter even if the motor current is lowered by noise (that is, after the actuation force is already generated). Note that the idle current sampling time is shown by KTSINF, actually, a count value corresponding to the time is shown by KTSINF.

Accordingly, only when the affirmative determination is made at step 225, the process goes to step 230 and determines whether or not the idle current sampling timer CTSINF is set to 0. Thereafter, when the idle current sampling timer CTSINF is set to 0 and the idle current INF is not yet sampled, the process goes to step 235, determines whether or not the motor current IMOTOR is made equal to or more than the idle current maximum value KMAX, and returns to step 210 until an affirmative determination is made.

When the affirmative determination is made at step 235, the process goes to step 240 and sets a motor current TMOTOR at the time to the idle current INF. Thereafter, the process goes to step 245 and increments the idle current sampling timer CTSINF and then calculates the target current value IMCUT at step 220 as described above. Thereafter, each time the target current value calculation is repeated, a negative determination is made at step 230, and the process goes to step 250. At step 250, whether or not the motor current IMOTOR is smaller than the idle current INF set at that time, and when the motor current IMOTOR is smaller than the idle current INF, the process goes to step 240 and updates the idle current INF to the smaller value. With this operation, the minimum value of the motor current IMOTOR in the period of time during which the idle current sampling timer CTSINF reaches the idle current sampling time KTSINF can be set as the idle current INF. The target current value calculation process is completed as described above.

On the completion of the target current value calculation process, the process goes to step 130 of FIG. 2 and determines whether or not the operation SW 18 is turned on. It means for a driver to actuate the EPB 2 and to intend to lock it that the operation SW 18 is turned ON, and it means that for the driver to intend to release the EPB 2 that the operation SW 18 is turned OFF. Thus, when an affirmative determination is made at step 130, the process goes to step 140 and determines whether or not a lock state flag FLOCK is turned ON. The lock state flag FLOCK is a flag that is turned ON when the EPB 2 is actuated and locked, and when the lock state flag FLOCK is turned ON, the EPB 2 has been actuated and a desired brake force has been already generated. Accordingly, only when a negative determination is made here, the process goes to a lock control process at step 150, whereas when an affirmative determination is made, since the lock control process has been completed, the process goes to step 160.

Figure 5:
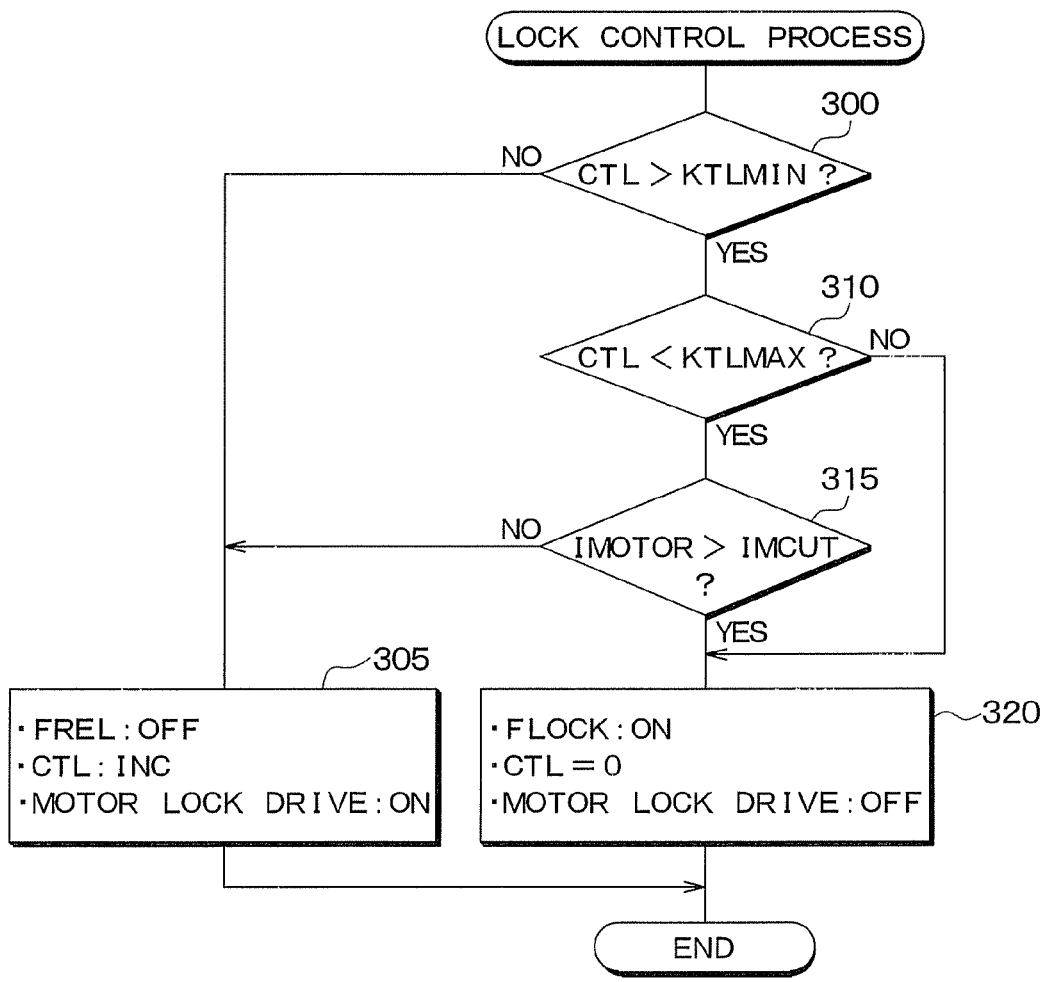
FIG. 5 is a flowchart showing details of a lock control process.

In the lock control process is a process in which the EPB 2 is actuated by rotating the motor, the electric motor 15 is stopped at a position where a desired brake force can be generated by the parking brake mechanism 12, and this state is maintained. FIG. 5 shows a flowchart showing details of a lock control process, and the lock control process will be explained referring to the figure.

First, at step 300, it is determined whether or not a lock control time counter CTL exceeds a previously determined minimum lock control time KTLMIN. The lock control time counter CTL is a counter for measuring the time passed from the time at which the lock control was started and starts a count operation at the same time the lock control process starts. The minimum lock control time KTLMIN is a minimum time which is assumed necessary to the lock control and is a value that is previously determined according to the length of the brake cables 13, the rotation speed of the electric motor 15, and the like. It is determined that a brake force generated by the tension of the brake cables 13 reaches or approaches a desired value when the motor current IMOTOR reaches the target current value IMCUT as shown step 315 to be described later. However, the motor current IMOTOR may exceed the target current value IMCUT due to the inrush current caused at the beginning of supply of a current to the electric motor 15, and the like. To cope with the above problem, an erroneous determination caused by the inrush current and the like can be prevented because masking can be performed by comparing the lock control time counter CTL with the minimum lock control time KTLMIN.

Accordingly, when the lock control time counter CTL does not exceeds the minimum lock control time KTLMIN, the lock control is still continued. Thus, the process goes to step 305 and turns off a release state flag, increments the lock control time counter CTL, and turns ON a motor lock drive, that is, rotates the electric motor 15 forward. With this operation, the gear mechanism 14 is driven by the forward rotation of the electric motor 15, the drive nut 14*d* moves in the axial direction of the output shaft 14*c*, and the brake cables 13 are pulled to a lock side.

In contrast, when an affirmative determination is made at step 300, it is determined whether or not the lock control time counter CTL is less than a previously determined maximum lock control time KTLMAX. The maximum lock control time KTLMAX is a maximum time which is assumed necessary to the lock control and is a value that is previously determined according to the length of the brake cable 13, the rotation speed of the electric motor 15, and the like. When the lock control time counter CTL exceeds the maximum lock control time KTLMAX, it is considered that a time when the lock control is finished has been reached. Accordingly, when the affirmative determination is made, the process goes to step 315.

At step 315, it is determined whether or not the motor current IMOTOR in the present control cycle exceeds the target current value IMCUT. Although the motor current IMOTOR is varied according to a load applied to the electric motor 15, since the load applied to the electric motor 15 corresponds to the tension of the brake cables 13 in the embodiment, the motor current IMOTOR has a value corresponding to a load of the brake cables 13. As a result, when the motor current IMOTOR exceeds the target current value IMCUT, the process goes to step 320 assuming that the desired brake force is generated by the tension of the brake cables 13, for example, when the friction surface of the brake shoe 11 in the parking brake mechanism 12 is depressed to the inner wall surface of the drum 10 by the brake cables 13 by a certain extent of force.

At step 320, the lock state flag FLOCK is turned ON to show that the EPB 2 has been locked, the lock control time counter CTL is reset to 0, and the motor lock drive is turned off (stopped). With this operation, the electric motor 15 is stopped, and thus the gear mechanism 14 is stopped. Since the brake cables 13 can be maintained in a pulled state by the friction force resulting from that the output shaft 14*c* is meshed with the drive nut 14*d* in the gear mechanism 14, the brake force generated at the time can be maintained. With this operation, the movement of the vehicle while parking can be restricted.

Further, when a negative determination is made at step 310, since the lock control time counter CTL still continues the count operation even if a time longer than the maximum lock control time KTLMAX passes after the lock control was started, a failure may occur. The target current value IMCUT may not be reached for a long time by the breakage of, for example, the gear mechanism 14 or the brake cables 13. In this case, the process goes to step 320 and turns off the motor lock drive likewise the above case. The lock control process is completed as described above.

In contrast, when a negative determination is made at step 130 of FIG. 2, the process goes to step 170 and determines whether or not a release state flag FREL is turned ON. The release state flag FREL is a flag that is turned ON when the EPB 2 is actuated and released, that is, when the brake force is released by the parking brake mechanism 12, and when the release state flag FREL is turned ON, the EPB 2 has been actuated and the brake force has been released. Accordingly, only when the negative determination is made here, the process goes to a release control process at step 180, whereas when an affirmative determination is made, since the release control process has been completed, the process goes to step 160.

Figure 6:
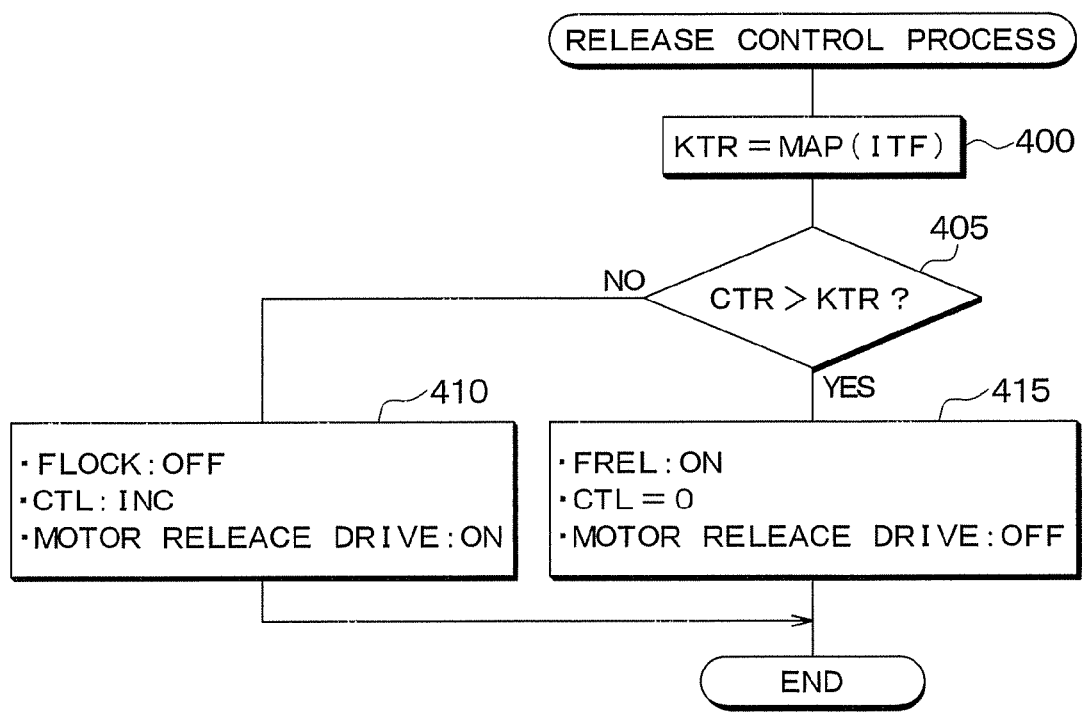
FIG. 6 is a flowchart showing details of a release control.

The release control process is performed such that the EPB 2 is actuated by rotating the electric motor 15 so that the brake force generated by the parking brake mechanism 12 is released. FIG. 6 shows a flowchart showing details of a release control, and the release control process will be explained referring to the figure.

Figure 7:
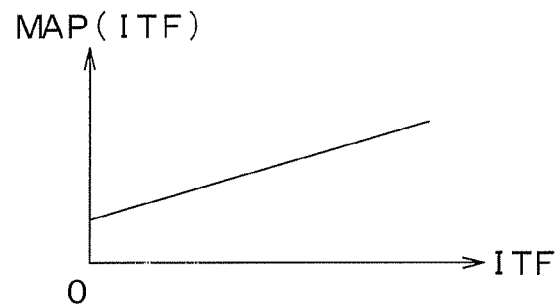
FIG. 7 is a graph showing a characteristics MAP (ITF) of a release drive time KTR to the target effective current ITF.

First, at step 400, a release drive time KTR is set. The release drive time KTR is more increased as the brake cables 13 are pulled by the electric motor 15 in a larger amount in the lock control. Accordingly, in the embodiment, the characteristics MAP (ITF) of the release drive time KTR is made larger as the target effective current ITF is more increased based on the characteristics MAP (ITF) to the target effective current ITF shown in FIG. 7, and the characteristics MAP (ITF) is set as the release drive time KTR. Thereafter, the process goes to step 405 and determines whether or not the release control time counter CTR for measuring the release drive time exceeds the release drive time KTR set at step 400. The release control time counter CTR is a counter for measuring the time passed from the time at which the release control was started and starts a count operation at the same time the release control process starts.

When the release control time counter CTR does not exceed the release drive time KTR, the release control is still continued. Thus, the process goes to step 410 and turns off the lock state flag FLOCK, increments a release control time counter CTR, and turns ON a motor release drive, that is, the electric motor 15 is rotated rearward. With this operation, the gear mechanism 14 is driven by the reverse rotation of the electric motor 15, the drive nut 14*d* moves in the axial direction of the output shaft 14*c*, and the brake cable 13 is returned to a release side so that the tension thereof is loosened.

In contrast, when an affirmative determination is made at step 405, the release state flag FREL is turned on to show that the release operation has been completed, the release control time counter CTR is reset to 0, and the motor release drive is turned OFF. With this operation, the electric motor 15 is stopped, and thus the gear mechanism 14 is stopped. Then, the brake cable 13 is maintained in a loosened state by the friction force resulting from the output shaft 14*c* meshed with the drive nut 14d in the gear mechanism 14. The release control process is completed as described above.

Figure 8:
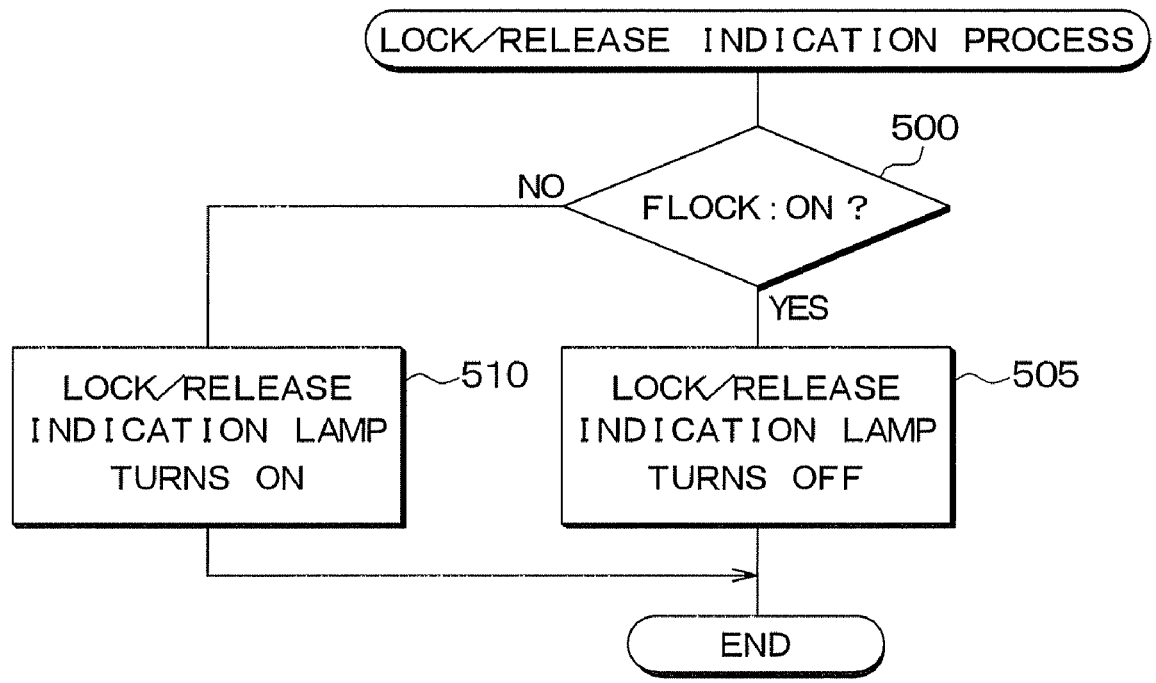
FIG. 8 is a flowchart showing details of a lock/release indication process.

When the lock control process and the release control process are finished as described above, a lock/release indication process is performed at step 160 of FIG. 2. FIG. 8 shows a flowchart showing the lock/release indication process in detail, and the lock/release indication process will be explained referring to the figure.

At step 500, whether or not the lock state flag FLOCK is turned on is determined. When an affirmative determination is made at step 500, the process goes to step 505 and turns on the lock/release indication lamp 20, whereas when a negative determination is made at step 500, the process goes to step 510 and turns off the lock/release indication lamp 20. As described above, when the EPB 2 is locked, the lock/release indication lamp 20 is turned on, whereas when it is released or a release control is started, the lock/release indication lamp 20 is turned off. With this operation, the driver can recognize whether or not the EPB 2 is locked. The lock/release indication process is completed as described above, thereby the parking brake control process is completed.

Figure 9:
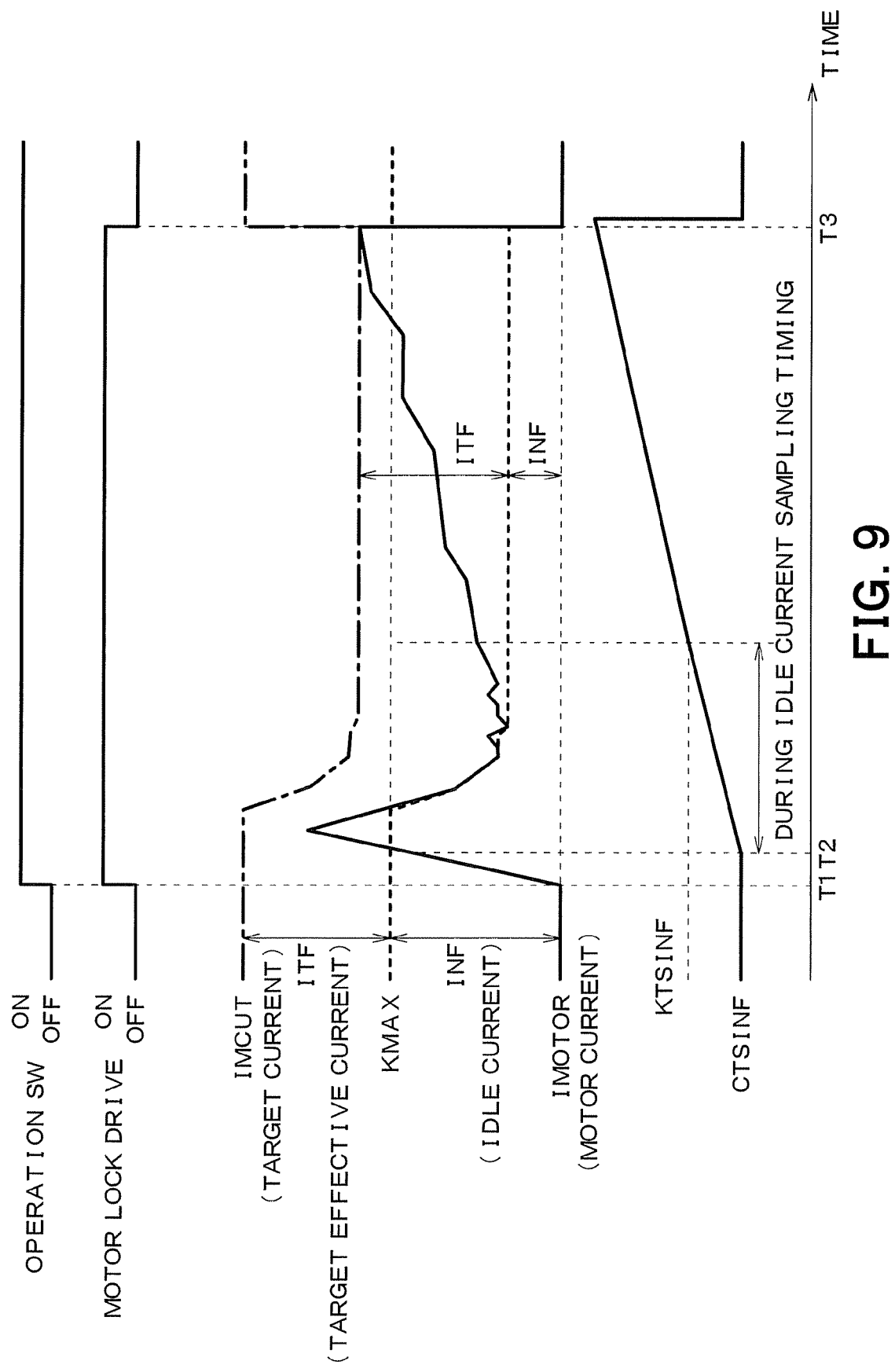
FIG. 9 is a timing chart when the parking brake control process is performed.

FIG. 9 is a timing chart when the parking brake control process described above is performed. As shown in the figure, as soon as the operation SW 18 is turned on at a time T1, the release state flag FREL is switched from a turned-on state to a turned-off state, and the motor lock drive is turned on. Then, the lock control time counter CTL is incremented. Then, a current flows to the electric motor 15. At the beginning of flow of the current to the electric motor 15, the motor current IMOTOR has a large value due to the inrush current and exceeds the idle current maximum value KMAX at a time T2. As a result, the idle current sampling timer KTSINF begins to be incremented, and the idle current INF is sampled until the idle current sampling timer CTSINF reaches the idle current sampling time KTSINF.

Thereafter the motor current IMOTOR gradually reduces from a large value resulting from the inrush current. Each time the motor current IMOTOR reduces, the minimum value thereof is updated as the idle current INF, and the minimum value of the motor current IMOTOR in the idle current sampling time KTSINF is finally set to the idle current INF. Further, since the value, which is obtained by adding the target effective current ITF to the idle current INF, is set as the target current value IMCUT, the idle current INF is finally made to the minimum value of the motor current IMOTOR in the idle current sampling time KTSINF, and the value, which is obtained by adding the target effective current ITF to the minimum value is set as the target current value IMCUT.

Then, a no-load state (idle state) in which no tension is generated to the brake cables 13 is finished and tension begins to be generated in the brake cables 13, that is, the friction surface of the brake shoe 11 comes into contact with the inner wall surface of the drum 10 and the brake force begins to be generated. When the motor current IMOTOR reaches the target current value IMCUT at a time T3, the lock control is completed assuming that the brake force generated by the tension of the brake cables 13 is set to a desired value. With this operation, the lock state flag FLOCK is turned on, the motor lock drive is stopped, and the lock control time counter CTL is reset to 0. Accordingly, the motor current is reduced and set to a current value (=0) when it is turned off.

In contrast, although not shown in the drawing, as soon as the operation SW 18 is turned off, the lock state flag FLOCK is switched from a turned-on state to a turned-off state, the motor release drive is turned on, and the current flows to the electric motor 15. Further, the release control time counter CTR is incremented. When the release control time counter CTR exceeds the release drive time KTR set based on the target effective current ITF, tension is removed from the brake cables 13, that is, the friction surface of the brake shoe 11 is moved away from the inner wall surface of the drum 10, the brake force is released, and a desired clearance is formed between the friction surface of the brake shoe 11 and the inner wall surface of the drum 10. With this operation, the release control is completed, the release state flag FREL is turned on, the motor release drive is stopped, and the release control time counter CTR is reset to 0. With this operation, the motor current is set to the current value (=0) when it is turned off.

As described above, in the embodiment, the minimum value of the motor current IMOTOR is set to the idle current INF after the electric motor 15 begins to be driven, specifically during the period of the idle current sampling time KTSINF. Accordingly, the idle current INF is set to a value by which reflects the temperature of the EPB 2 and the dispersion of individual units of the electric motor 15. Accordingly, it is possible to provide a parking brake control device, which can set the target current value IMCUT capable of coping with the dispersion of individual units of the electric motor 15 by calculating the target current value IMCUT by adding the target effective current ITF necessary to generate the actuation force to the idle current INF set as described above.

Further, since the idle current INF having the value by which the temperature of the EPB 2 is reflected can be obtained without measuring the temperature of the EPB 2, there can be also provided a parking brake control device which can set the target current value IMCUT without additionally providing a sensor for detecting the temperature or the idling speed of the electric motor 15.

Second Embodiment

A second embodiment of the present invention will be explained. Since a brake system of the present embodiment is the same as the first embodiment except that a method of setting the idle current INF is different from that of the first embodiment, only different portions will be explained.

Figure 10:
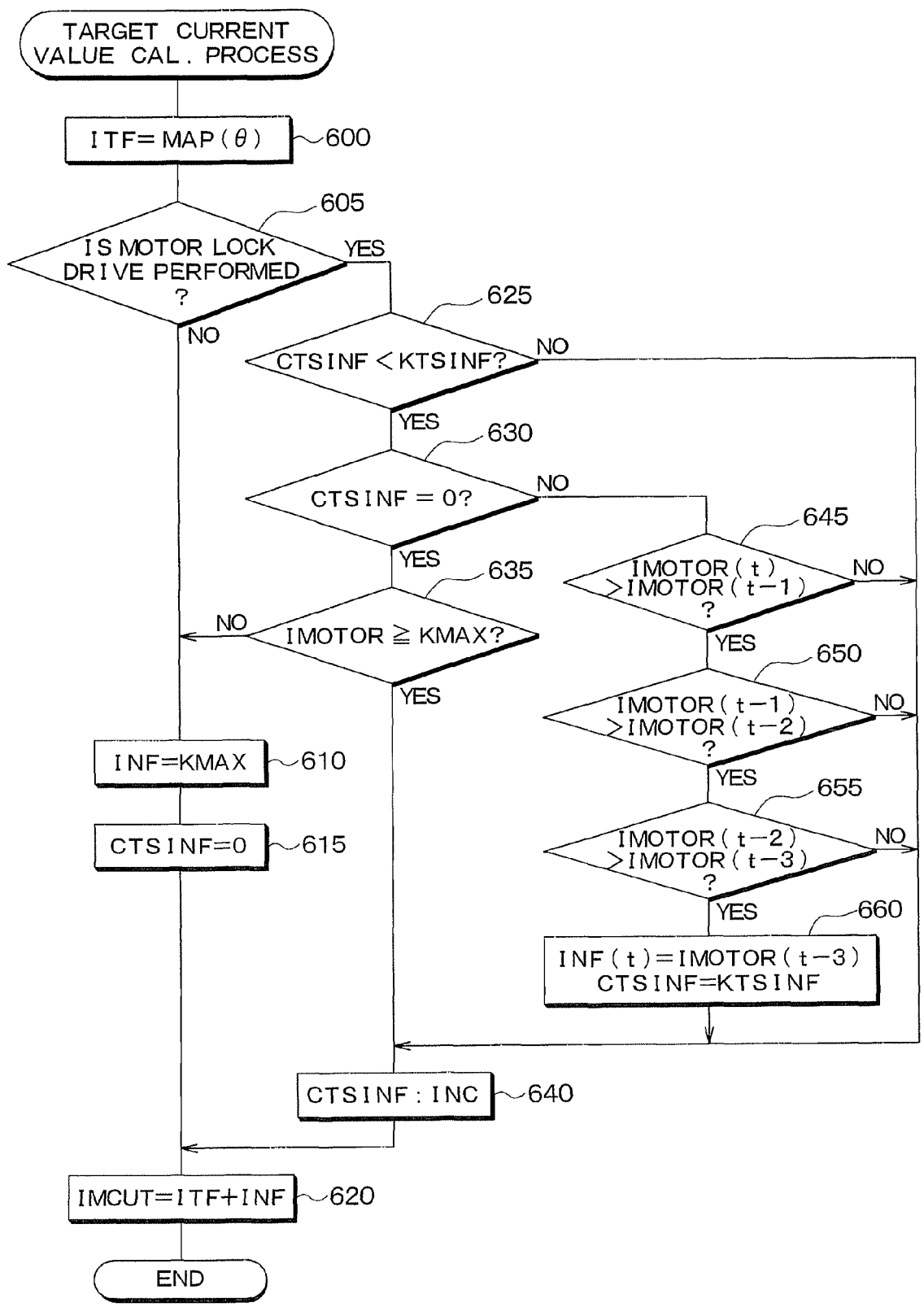
FIG. 10 is a flowchart of a target current value calculation process performed by an EPB-ECU 7 of a brake system according to a second embodiment of the present invention.

In the embodiment, when the tendency of the idle current INF changes to an increasing tendency during the idle current sampling time KTSINF, a minimum value at the moment when the tendency changes to the increasing tendency is set as a final idle current INF. FIG. 10 shows a flowchart of a target current value calculation process performed by an EPB-ECU 17 of a brake system according to the present embodiment. A method of setting the idle current INF in the embodiment will be explained referring to the figure.

As shown in FIG. 10, as to steps 600 to 640, the same steps as the steps 200 to 235 and step 245 shown in FIG. 3 described above are performed.

The idle current INF is set at steps 645 to 660. Specifically, at step 645, it is determined whether or not a motor current IMOTOR (t), which is determined in a present calculation cycle, is larger than the motor current IMOTOR (t−1) determined in a previous calculation cycle. At step 650, it is determined whether or not the motor current IMOTOR (t−1) determined in the previous calculation cycle is larger than a motor current IMOTOR (t−2) determined in a second previous calculation cycle. Further, at step 655, it is determined whether or not the motor current IMOTOR (t−2) determined in the second previous calculation cycle is larger than a motor current IMOTOR (t−3) determined in a third previous calculation cycle.

When an affirmative determination is made at all steps 645 to 655, a process goes to step 660 and sets the motor current IMOTOR (t−3) determined in the third previous calculation cycle as the idle current INF (t). At the same time, an idle current sampling timer CTSINF is set to an idle current sampling time KTSINF, and it is assumed that the idle current sampling timer CTSINF reaches the idle current sampling time KTSINF.

According to the above process, when the idle current INF continuously increases in the three control cycles, it is determined that the tendency of the idle current INF changes to the increasing tendency, and the minimum value (first value) in the three control cycles can be set as the idle current INF. When the tendency of the idle current INF changes to the increasing tendency during the idle current sampling time KTSINF, the minimum value at the moment when the tendency changes to the increasing tendency can be set as the final idle current INF. A target current value IMCUT can be also calculated by adding the idle current INF as described above to the target effective current ITF.

Figure 11:
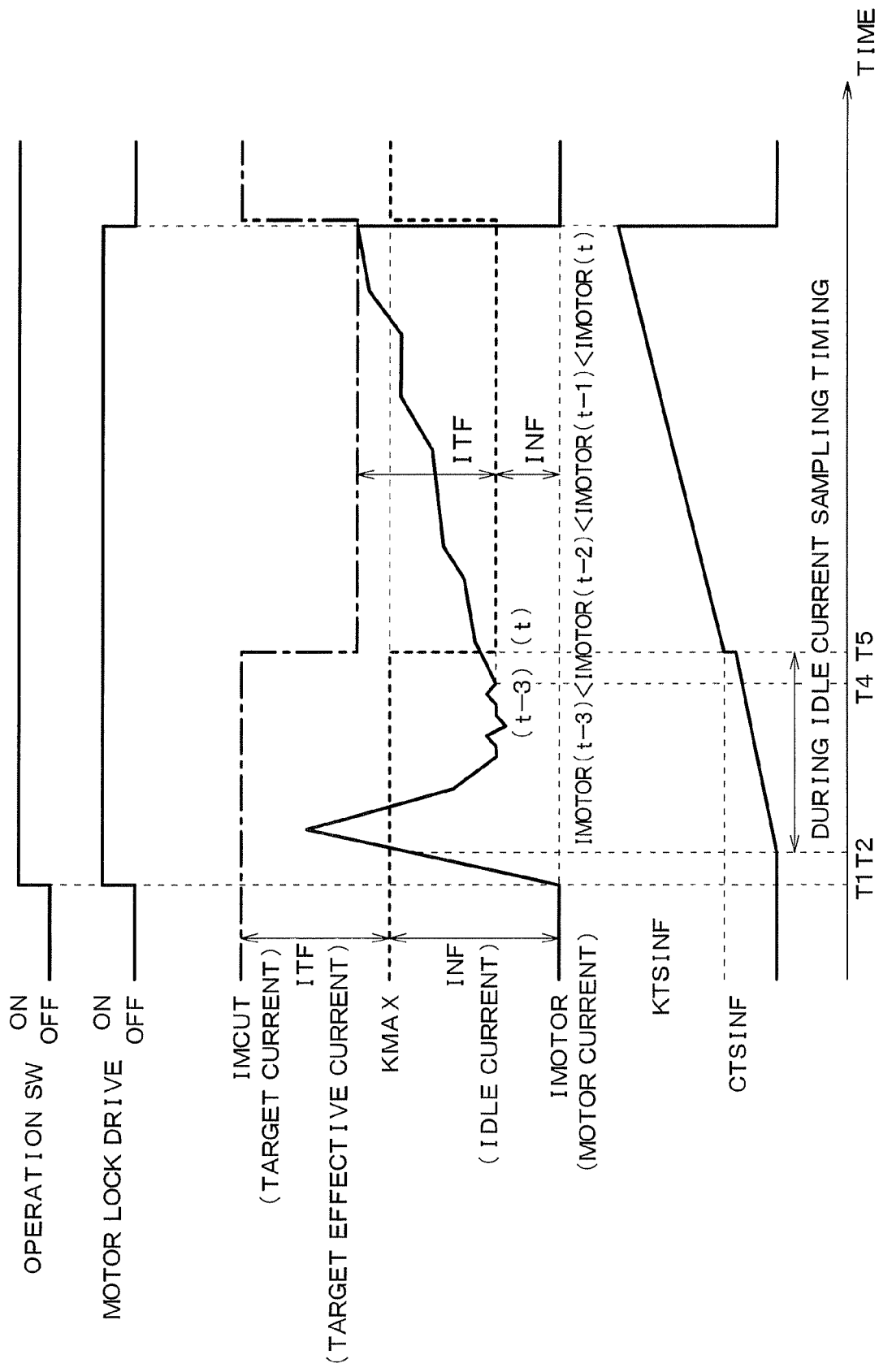
FIG. 11 is a timing chart when a parking brake control process is performed.

FIG. 11 is a timing chart when the idle current INF is set by the above method. As shown in the figure, idle currents INF are dispersed after an inrush current is generated. However, when the idle currents INF continuously increase three times from times T4 to T5, the minimum value of them is set as the idle current INF. With this operation, the target current value IMCUT can be calculated by adding the idle current INF to the target effective current ITF.

Note that since the idle current sampling timer CTSINF is set to the idle current sampling time KTSINF, the idle current sampling timer CTSINF is set to a value larger than the idle current sampling time KTSINF thereafter, and the motor current IMOTOR is continuously incremented until it reaches the target current value IMCUT and is reset.

Third Embodiment

A third embodiment of the present invention will be explained. Although a brake system of the present embodiment sets the idle current INF by the same conception as that of the second embodiment, it sets the idle current INF based on a motor revolution VMOTOR in place of the motor current IMOTOR. Since the other portions of the present embodiment are the same as those of the first and second embodiments, only different portions will be explained.

Figure 12:
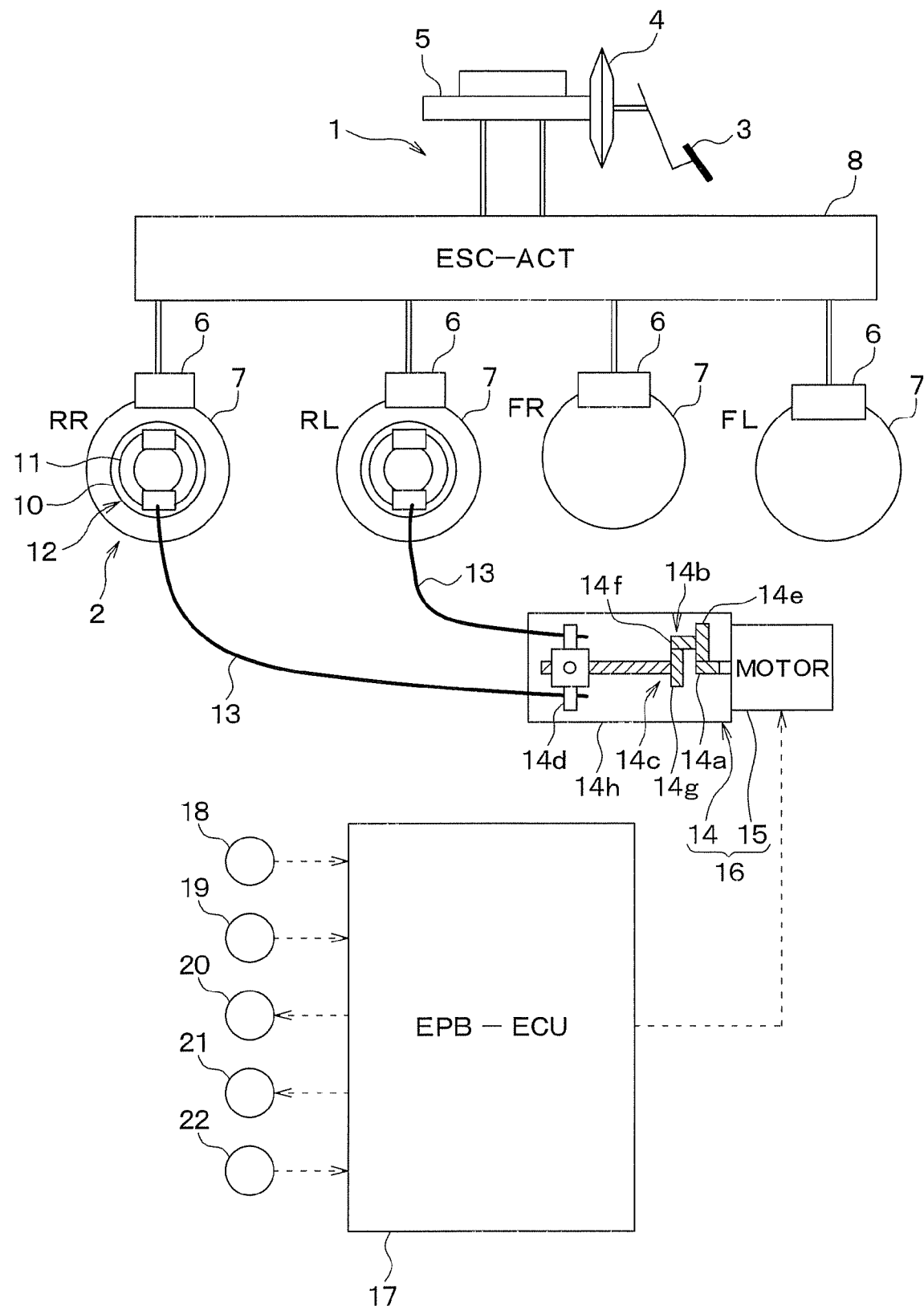
FIG. 12 is a schematic figure showing an overall structure of a vehicular brake system including a parking brake control device according to a third embodiment of the present invention.

FIG. 12 is a schematic view showing an outline of a vehicle brake system to which a parking brake control device according to the embodiment is applied. As shown in the figure, the vehicle brake system has a motor revolution sensor 22 for detecting a motor revolution VMOTOR, and a signal detected by the motor revolution sensor 22 is input to an EPB-ECU 17.

In the embodiment, when the tendency of the motor revolution VMOTOR changes to a decreasing tendency in an idle current sampling time KTSINF based on the motor revolution VMOTOR detected as described above, an idle current INF at the moment when the tendency changes to the decreasing tendency is set as a final idle current INF.

Figure 13:
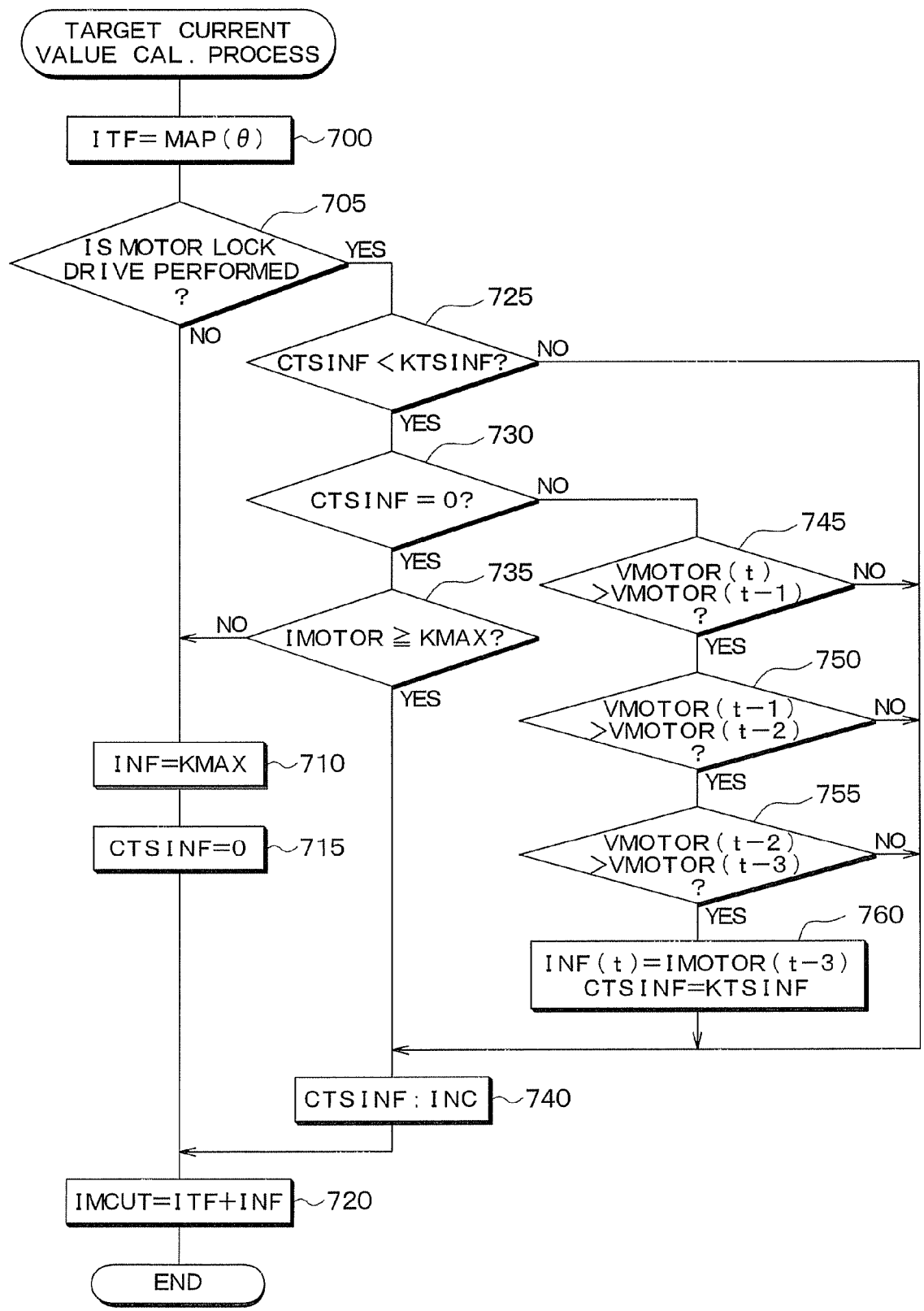
FIG. 13 is a flowchart of a target current value calculation process.

FIG. 13 shows a flowchart of a target current value calculation process performed by the EPB-ECU 17 of the vehicle brake system according to the embodiment, and a method of setting the idle current INF in the embodiment will be explained referring to the figure.

As shown in FIG. 13, as to steps 700 to 740, the same steps as the steps 600 to 640 shown in FIG. 10 described above are performed.

The idle current INF is set at steps 745 to 760. Specifically, at step 745, it is determined whether or not a motor revolution VMOTOR (t) determined in a present calculation cycle is smaller than a motor revolution VMOTOR (t−1) determined in a previous calculation cycle. Further, at step 750, it is determined whether or not the motor revolution VMOTOR (t−1) determined in the previous calculation cycle is smaller than a motor revolution VMOTOR (t−2) determined in a second previous calculation cycle. Further, at step 755, it is determined whether or not the motor revolution VMOTOR (t−2) determined in the second previous calculation cycle is smaller than a motor revolution VMOTOR (t−3) determined in a third previous calculation cycle.

When an affirmative determination is made at all steps 745 to 755, the process goes to step 760 and sets the idling current INF (t−3) at the time the motor revolution VMOTOR (t−3) is determined in the third previous calculation cycle as the idle current INF (t). At the same time, the idle current sampling timer CTSINF is set to the idle current sampling time KTSINF, and it is assumed that the idle current sampling timer CTSINF reaches the idle current sampling time KTSINF.

According to the above process, when the motor revolution VMOTOR continuously decreases in the three control cycles, it is determined that an actuation force begins to be generated, and the idle current INF (t−3) at the time the motor revolution VMOTOR begins to reduce in the three control cycles can be set as the idle current INF. As described above, when the tendency of the motor revolution VMOTOR changes to the decreasing tendency during the idle current sampling time KTSINF, the idle current INF at the moment when the tendency changed to the decreasing tendency can be set as a final idle current INF. The target current value IMCUT can be also calculated by adding the idle current INF as described above to the target effective current ITF.

Figure 14:
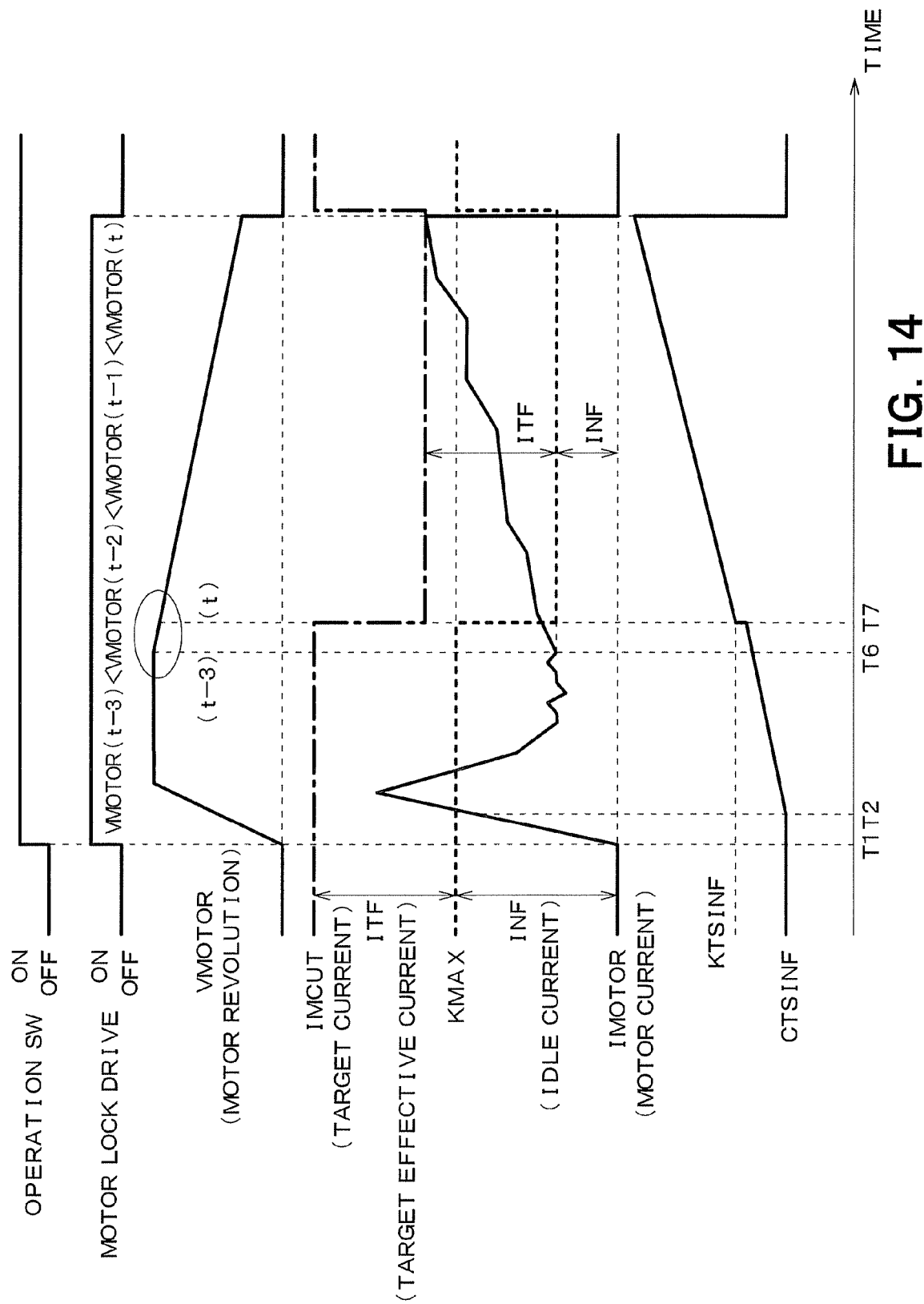
FIG. 14 is a timing chart when a parking brake control process is performed.
Figure 15:
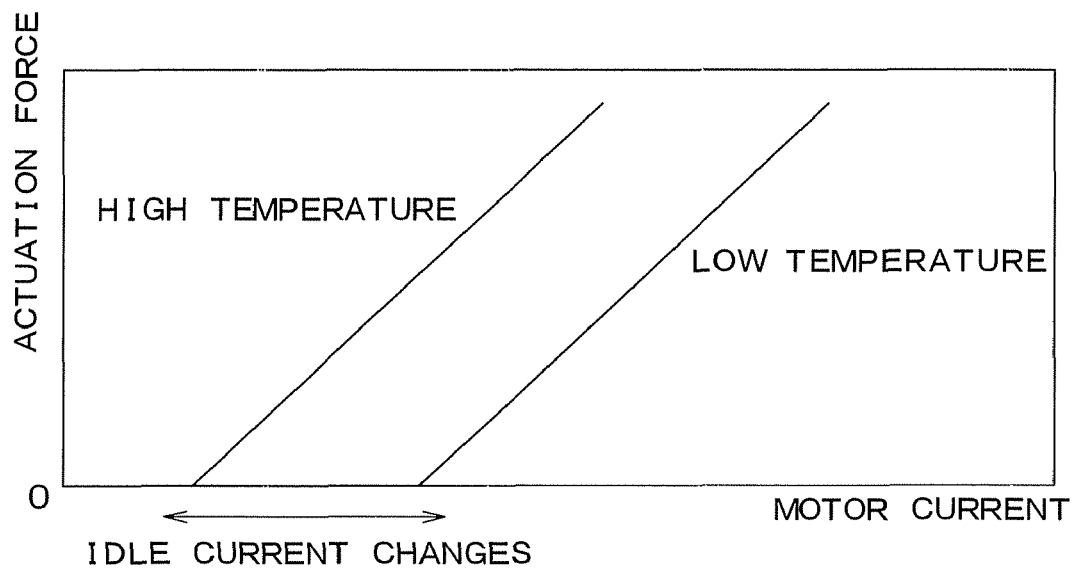
FIG. 15 is a graph showing the relation between a motor current including an idle current and the temperature and the actuation force of a brake mechanism.
Figure 16:
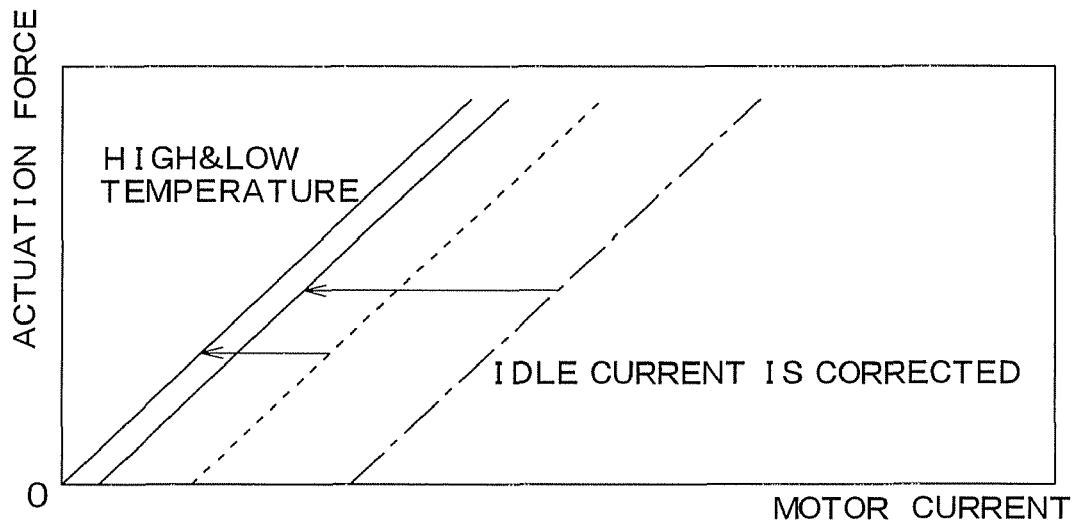
FIG. 16 is a graph showing the relation between the motor current, to which an idle current capable of canceling the temperature change of an idle current is set, and the actuation force.

FIG. 14 is a timing chart when the idle current INF is set by the above method. As shown in the figure, after the inrush current is generated, idle currents INF are dispersed. However, when the motor revolution VMOTOR continuously decreases three times at times T6 to T7, the idle current INF (t−3) at the time the motor revolution VMOTOR begins to decrease is set as the final idle current INF assuming that the actuation force begins to be generated. With this operation the target current value IMCUT can be calculated by adding the idle current INF to the target effective current ITF.

Note that since the idle current sampling timer CTSINF is set to the idle current sampling time KTSINF, the idle current sampling timer CTSINF is set to a value larger than the idle current sampling time KTSINF thereafter, and the motor current IMOTOR is continuously incremented until it reaches the target current value IMCUT and is reset.

In the embodiment, since the motor revolution sensor 22 is provided, it is necessary to increase the number of sensors as compared with the first and second embodiments. However, since it is not necessary to use a sensor for detecting a motor temperature, it is possible to eliminate at least a sensor conventionally used to detect a motor temperature.

Other Embodiment

Although the respective embodiments explain the brake system in which the brake force is generated by pulling the brake cables 13 by driving the electric motor 15, any brake system can be employed as long as it generates the actuation force by the electric motor 15. For example, a brake system, which generates a brake force by pushing a hydraulic piston by driving the electric motor 15 and increasing a hydraulic pressure, may be employed. Note that, in this case, a force for pushing the hydraulic piston, a hydraulic pressure, and the like correspond to the actuation force in addition to the brake force itself.

Further, the brake system is explained exemplifying the drum type EPB 2. However, the present invention can be also applied to a disc brake type EPB 2 which generates a brake force by pressing a brake pad corresponding to a friction member to a brake disc corresponding to a member to be subjected to friction by adjusting the pressure of a wheel cylinder by driving a motor.

Note that the steps shown in the respective figures correspond to means for performing various processes. That is, the portion of the EPB-ECU 17 for performing the target current value calculation process at step 120 corresponds to a target current value calculation portion, and the portion thereof for performing the lock control process at step 150 corresponds to a lock control portion.

What is claimed is:

1. A parking brake control device comprising;
    a lock control portion for stopping output of a motor current when the motor current reaches a target current value while a lock control for generating a brake force to a wheel is performed by driving a motor according to the motor current outputted to the motor, moving a friction member in a direction toward a member to be subjected to friction attached to a wheel by an actuation force generated by driving the motor, and generating the brake force to the wheel;
    an idle current value setting portion for setting, as an idle current, the minimum value of the motor current in a state that the actuation force is not generated after an inrush current, which is generated at a moment when the motor current flows and the motor starts to rotate; and
    a target current value calculation portion for calculating the target current value as the sum of the set idle current and a target effective current for generating the actuation force.

2. A parking brake control device comprising:
    a lock control portion for stopping an output of a motor current when the motor current reaches a target current value while a lock control for generating a brake force to a wheel is performed by driving a motor according to the motor current outputted to the motor, moving a friction member in a direction toward a member to be subjected to friction attached to a wheel by an actuation force generated by driving the motor, and generating the brake force to the wheel;
    an idle current value setting portion for setting, as an idle current, a motor current which begins to increase when the motor current continuously increases in three control cycles after an inrush current, which is generated at a moment when the motor current flows and the motor starts to rotate in a state the actuation force is not generated; and
    a target current value calculation portion for calculating the target current value as the sum of the set idle current and a target effective current for generating the actuation force.

3. A parking brake control device comprising:
    a lock control portion for stopping an output of a motor current when the motor current reaches a target current value while a lock control for generating a brake force to a wheel is performed by driving a motor according to the motor current outputted to the motor, moving a friction member in a direction toward a member to be subjected to friction attached to a wheel by an actuation force generated by driving the motor, and generating the brake force to the wheel;
    an idle current value setting portion for setting, as an idle current, a motor current which begins to decrease when a motor revolution continuously decreases in three control cycles after an inrush current, which is generated at a moment when the motor current flows and the motor starts to rotate in a state the actuation force is not generated, the motor current being set as the idle current based on a detection signal from a motor revolution sensor for detecting the motor revolution; and
    a target current value calculation portion for calculating the target current value as the sum of the set idle current and a target effective current for generating the actuation force.

* * * * *